July 27, 1965  R. R. ODDO ET AL  3,197,764
UNAMBIGUOUS ENCODER

Filed Jan. 7, 1963  9 Sheets-Sheet 1

FIG. 1

ROCCO R. ODDO
GEORGE LAPP
RALPH M. SEELAGY
INVENTORS

BY S. A. Giarratana
Francis L. Masselle

ATTORNEYS

R. R. ODDO ET AL 3,197,764

UNAMBIGUOUS ENCODER

Filed Jan. 7, 1963

ROCCO R. ODDO
GEORGE LAPP
RALPH M. SEELAGY
*INVENTORS*

BY S. A. Giarratana
Francis L. Masselle

ATTORNEYS

ROCCO R. ODDO
GEORGE LAPP
RALPH M. SEELAGY
INVENTORS

FIG. 5C

United States Patent Office 3,197,764
Patented July 27, 1965

3,197,764
UNAMBIGUOUS ENCODER
Rocco R. Oddo, Brooklyn, N.Y., and George Lapp, Oakland, and Ralph M. Seelagy, Clifton, N.J., assignors to General Precision Inc., Little Falls, N.J., a corporation of Delaware
Filed Jan. 7, 1963, Ser. No. 249,701
7 Claims. (Cl. 340—347)

The present invention relates to a non-ambiguous binary encoder, and more particularly to a non-ambiguous binary encoder which produces an output from +0 to 89.9 and −89.0 to −0 without changing its direction of rotation and without adding additional groups of tracks required by prior encoders.

Prior to the present invention, encoders for producing an output from +0 to 89.9 and −89.9 to −0 had three electrically isolated groups of code tracks to provide the +0 to 89.9 output and at least two additional groups of code tracks to provide the −89.9 to −0 output. The additional groups of code tracks increased the length of the drum required, which in turn, increased the weight and cost of the encoders. In addition, ambiguity problems were also present to some extent.

In accordance with one embodiment of the present invention, a +89.9 encoder is provided which eliminates the need for the two additional groups of code tracks mentioned above and consequently reduces the length of the encoder drum. This is accomplished by providing two coaxially aligned drums mechanically connected together with an 18–1 gear ratio. The high speed drum has two electrically isolated groups of code tracks with a Gray code excess 3 and a high speed switching track of an electromechanical trigger. The trigger provides the plus or minus designation without ambiguity, and suitable logic circuitry is provided to complement the outputs of the most significant tracks of each of the groups of tracks on the high speed drum and to reverse their lead and lag designations in the negative region. When the most significant bit of a Gray code excess 3 is complemented, the same numbers which formerly indicated 0 to 9 will indicate 9 to 0. Therefore the same two groups of tracks on the high speed drum can be used to provide the 0–9 and 9–0 outputs as the group of tracks on the low speed drum goes from +0 to +8 and −8 to −0 without changing the direction of rotation of the drums.

Accordingly, it is one object of the invention to reduce the size, weight and cost of a binary encoder.

It is another object of the invention to provide an encoder having a non-ambiguous output.

It is a further object of the invention to provide a ±89.9 encoder having a plurality of groups of code tracks which produce Gray code excess 3 binary outputs and to provide suitable logic circuitry for complementing the outputs of the most significant tracks of each group of tracks in the negative region so that the same groups of tracks can be used to produce the +0 to +89.9 output in the positive region and the −0 to −89.9 output in the negative region.

Other objects and features of novelty of the present invention will be specifically pointed out or will otherwise become apparent when referring, for better understanding of the invention, to the following description taken in conjunction with the accompanying drawings, wherein;

Figure 1:
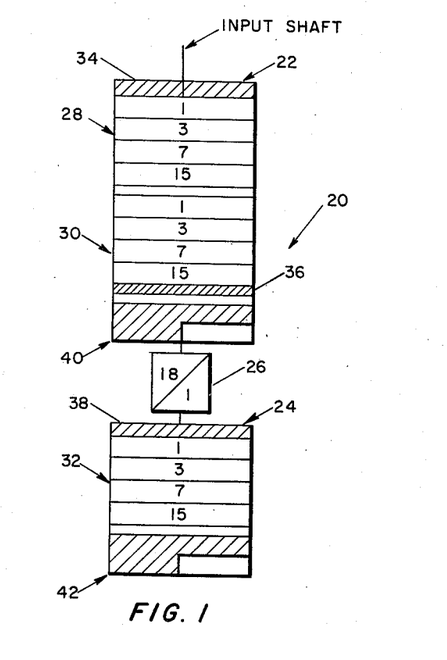
FIG. 1 is a plan view of a pair of encoder drums and the code tracks thereon which embody features of the present invention.

Referring to FIG. 1, a binary encoder assembly 20 is illustrated which embodies features of the present invention. It comprises a high speed drum 22 drivingly connected to a low speed drum 24 by a speed reducer 26 having an 18–1 reduction. The high speed drum 22 has two electrically isolated groups of code tracks 28 and 30 and the low speed drum 24 has a single group of code tracks 32. The particular drums illustrated provide a ±89.9 output. The group of tracks 32 produce the 0 to 8 and −8 to −0 output for each revolution of the low speed drum. The group of tracks 30 produce the more significant 0–9 output each nine revolutions of the high speed drum and the group of tracks 28 produce the less significant 0–9 output.

Each group of tracks 28–32 contains four individual code tracks which have been designated by the numbers 1, 3, 7, and 15, and each group of tracks employ a Gray code excess 3. The tracks are read out by suitable brushes and logic circuitry as will be described in greater detail hereinafter. The tracks, drums and brushes are oriented relative to one another so that when the input shaft rotates the high speed drum 22 through nine revolutions, a +0 to +89.9 output is produced. Continued rotation of the input shaft in the same direction through an additional nine revolutions produces a −89.9 to −0 output. At this point the low speed drum 24 will have completed one complete revolution. To accomplish this the group of code tracks 32 on the low speed drum 24 are arranged to provide the +0 to −8 output over the first one-half revolution of the low speed drum and the −8 to −0 output over the other second one-half revolution of the drum. The two groups of code tracks 28 and 30 on the high speed drum are arranged to produce a 0 to 9.9 output each nine revolutions of the drum. By employing a Gray code excess three on the groups of tracks 28 and 30, the outputs of the brushes of the most significant track 15 of each group can be complemented during the tenth to the eighteenth revolutions of the high speed drum to produce an output which decreases from 9.9 to 0 during the nine revolutions in which its most significant bit is complemented. This can be seen from the following example of the Gray code excess 3:

| N | 15 7 3 1 Gray Code Excess 3 |
|---|---|
| 0 | 0 0 1 0 |
| 1 | 0 1 1 0 |
| 2 | 0 1 1 1 |
| 3 | 0 1 0 1 |
| 4 | 0 1 0 1 |
| 5 | 1 1 0 0 |
| 6 | 1 1 0 1 |
| 7 | 1 1 1 1 |
| 8 | 1 1 1 0 |
| 9 | 1 0 1 0 |

It is apparent that the most significant bit of the numbers 0–4 is a 0 and the most significant bit of the numbers 5–9 is a 1. When this most significant bit is complemented as described above, the 0 bits are converted to 1 bits and the 1 bits are converted to 0 bits. With this conversion, the number 0 in the Gray code excess 3 becomes the number 9, the number 1 changes to 8, 2 to 7, 3 to 6, 4 to 5, 5 to 4, 6 to 3, 7 to 2, 8 to 1 and 9 changes to 0. Therefore by the simple expedient of complementing the most significant bit the output of the two groups of code tracks 28 and 30 is reversed during the tenth to the eighteenth revolutions of the high speed drum 22. At the same time the low speed drum 24 goes from −8 to −0 so that the two drums combine to produce a −89.9 to −0 output.

The brushes of the most significant tracks of the groups of tracks 28 and 30 are complemented by suitable logic circuitry triggered by an electromechanical trigger having a high speed switching track 40 on the high speed drum 22 and a low speed switching track 42 on the low speed drum 24 as will be described. Since the two groups of tracks 28–30 cooperate with the group of tracks 32 to produce the ±89.9 output, the need for an additional two groups of tracks on the high speed drum 22 to be read during the −89.9 to −0 output in place of the groups 28 and 30 is eliminated.

Figure 2A:
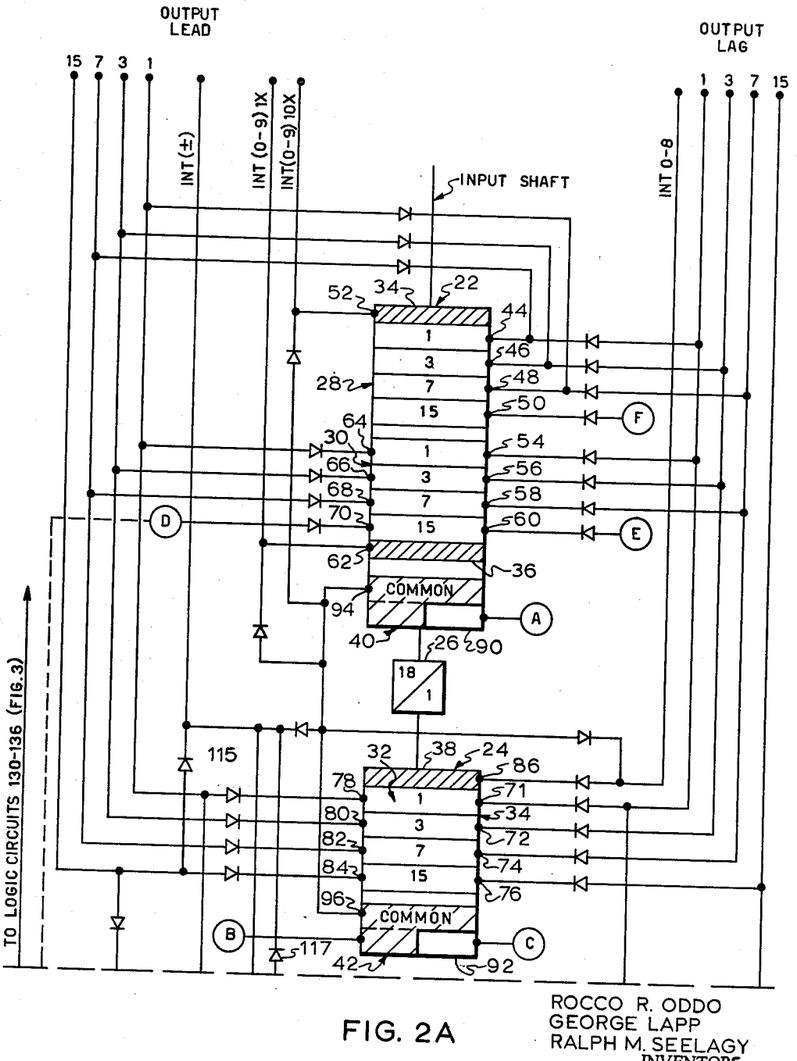
FIGS. 2a and 2b jointly constitute a schematic diagram of circuitry for reading the drums of FIG. 1.
Figure 2B:
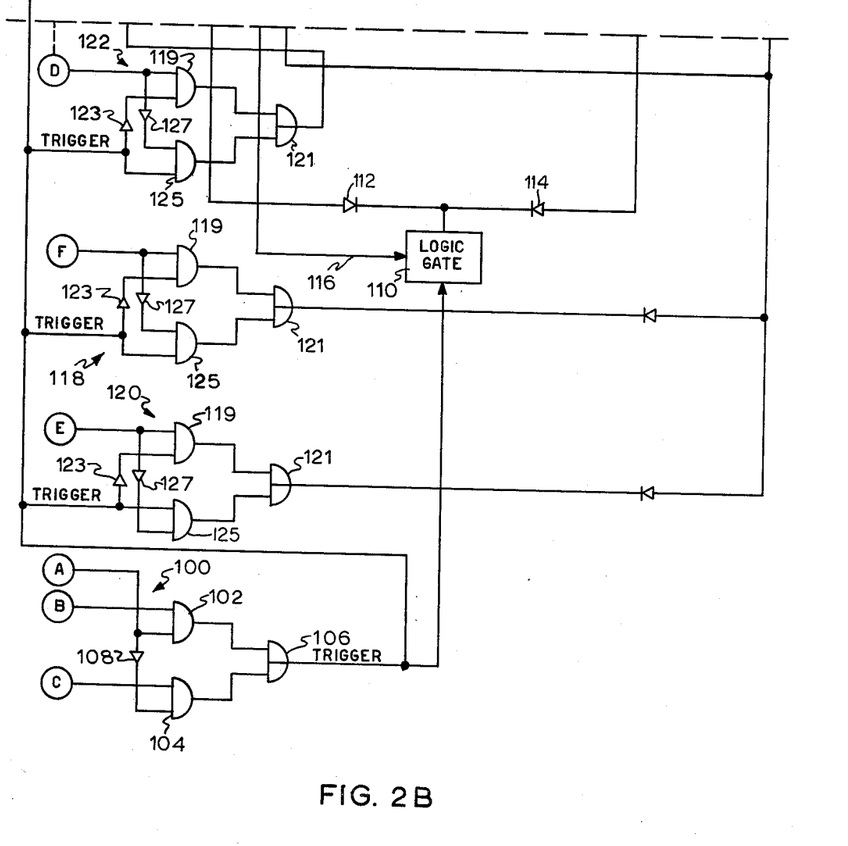

Referring to FIG. 2, the high and low speed drums 22 and 24 are illustrated along with suitable brushes and circuitry for reading out the groups of tracks on the drums. Lag brushes 44, 46, 48, 50 make sliding electrical contact with each of the code tracks 1, 3, 7 and 15, respectively, of the group of tracks 28 and a brush 52 makes sliding electrical contact with a common track 34 associated with the group of tracks 28. Lag brushes 54, 56, 58, 60 make sliding electrical contact with the tracks 1, 3, 7 and 15, respectively, of the group of tracks 30 and a brush 62 makes sliding electrical contact with a common track 36 associated with the group of tracks 30. Lead brushes 64, 66, 68, 70 also make sliding electrical contact with the tracks 1, 3, 7 and 15, respectively, of the group of tracks 30.

Similarly, lag brushes 71, 72, 74, 76 and lead brushes 78, 80, 82, 84 make sliding electrical contact with the tracks 1, 3, 7 and 15 of the group of tracks 32 on the low speed drum 24 while a brush 86 makes sliding electrical contact with a common track 38 associated with this group of code tracks.

The high speed switching track 40 has a non-conducting bit 90 which occupies 180° of the high speed track and the low speed switching track 42 has an identical non-conducting bit 92. An A brush makes sliding electrical contact with the high speed track 40 in position to pass over the non-conducting bit 90 and a pair of B and C brushes make sliding electrical contact with the low speed switching track 42 in position to pass over the non-conducting bit 92. Brushes 94 and 96 make sliding electrical contact with common tracks formed on the high and low speed switching tracks 40 and 42, respectively. The A, B and C brushes are connected to a trigger circuit 100 which produces a plus output during the first one-half revolution of the low speed drum 24 and a negative output during the second one-half revolution of the low speed drum 24. The orientation of the non-conducting bits 90 and 92 relative to one another is such that when the brush A is at a transition point, the lead and lag brushes B and C are always spaced from a transition point on the low speed track. The angular orientation of the lead and lag brushes B and C is also such that after the single brush A changes state, the lag brush C changes state before the single brush A changes state again. The trigger circuit 100 reads out the lead brush B when the single brush A is in one state and reads out the lag brush C when the single brush is in its other state.

The trigger circuit 100 comprises a pair of AND gates 102 and 104 which are connected to an OR gate 106. The A brush is connected directly to the AND gate 102 and to the AND gate 104 through an inverter 108. The B brush is connected directly to the AND gate 102 and the C brush is connected directly to the AND gate 104. Consequently, the B brush is read out through the AND gate 102 and OR gate 106 when the A brush enables the gate 102 and the C brush is read out through the AND gate 104 and OR gate 106 when the A brush enables the gate 104.

The brushes 94 and 96 on the high and low speed switching tracks 40 and 42, respectively, are both connected to a ± interrogate terminal and the output of the trigger circuit 100 is connected to the lead and lag terminals 1 through a logic gate 110 and respective diodes 112 and 114. At this point it is noted that lead and lag voltage is applied to the lead and lag terminals 1, 3, 7 and 15 at all times. The condition of the electromechanical trigger is read out through the trigger circuit 100 by grounding the ± interrogate terminal in the positive region (+0 to +89.9) the trigger circuit output is a 0 and in the negative region (−89.9 to −9) it is a 1 voltage. The purpose of the gate 110 and the diodes 112 and 114, and for that matter the purpose of the other diodes illustrated in FIG. 2, is to prevent sneak circuits when the groups of tracks 28–32 and the electromechanical trigger are being interrogated.

The gate 110 is connected to the ± interrogate terminal by a lead 116 so that it is enabled only when the ± interrogate terminal is grounded to interrogate the electromechanical trigger. It will also be observed that the ± interrogate terminal is connected directly to the lead and lag output terminals 15 by diodes 115 and 117, respectively. Consequently the output at both the lead and lag output terminals when the ± interrogate terminal is grounded will be 0001 in the positive region and 1001 in the negative region. In the Gray code excess 3, 1001 is the number 11 and 0001 is the number 12.

The brushes 44, 46, 48 are each connected to the lag and lead output terminals 1, 3 and 7 and the brush 50 is connected to a logic circuit 118 by a lead F. The lag brushes 54, 56, 58 are connected to the lag output terminals 1, 3 and 7, respectively, and the lag output brush 60 is connected to a logic circuit 120 by a lead E. The lead brushes 64, 66, 68 are connected to the lead output terminals 1, 3 and 7, respectively, and the lead brush 70 is connected to a logic circuit 122 by a lead D. The lead brushes 78, 80, 82, 84 are connected to the lead output terminals 1, 3, 7 and 15, respectively, and the lag outputs 71, 72, 74, 76 are connected to the lag output terminals 1, 3, 7 and 15, respectively. It will be observed that the brushes 76 and 84 engaging the most significant track 15 do not go through logic circuitry.

The common brush 62 associated with the group of tracks 30 is connected to a (0–9)1X interrogate terminal for interrogating the group of code tracks 30. The common brush 52 is connected directly to a (0–9)10X interrogate terminal for interrogating the group 28, and the common brush 86 is connected to a (0–8) interrogate terminal for interrogating the group of tracks 32. The interrogate terminals (0–9) are also connected to the brushes 94 and 96 contacting the common track of the high and low speed switching tracks. Consequently when either of the groups of tracks 28 and 30 are interrogated by grounding (0–9)10X and (0–9)1X terminals, respectively, the output of the trigger logic circuit 100 is applied to the three logic circuits 118, 120 and 122. At the same time the output of the most significant tracks 15 of the groups of tracks 28 and 30 will be applied to the logic circuits 122, 120 and 118 through the leads D, E and F, respectively.

The output of the logic circuit 122 is connected to the lead output terminal 15 and the outputs of the logic circuits 118 and 120 are connected to the lag output terminal 15. When the output trigger circuit 100 is 0 in the positive region, each of the logic circuits 118, 120, 122 will read out the outputs of the brushes 50, 60 and 70 directly through AND gates 119 and OR gates 121, the inverters 123 inverting the 0 trigger signal to enable the gates 119. However, when the output of the trigger circuit 100 is a 1 voltage in the negative region, the logic circuits 118–122 will complement the outputs of the brushes 50, 60 and 70 so that the physical readout of 0 to 9 for each of the groups of tracks 28, 30 is electrical changed to 9–0. Specifically, the 1 voltage trigger signal in the negative region enables the gates 125 so that the brushes 50, 60 and 70 are read out through the AND gates 125 and OR gates 121 after being inverted by the inverters 127.

Figure 3:
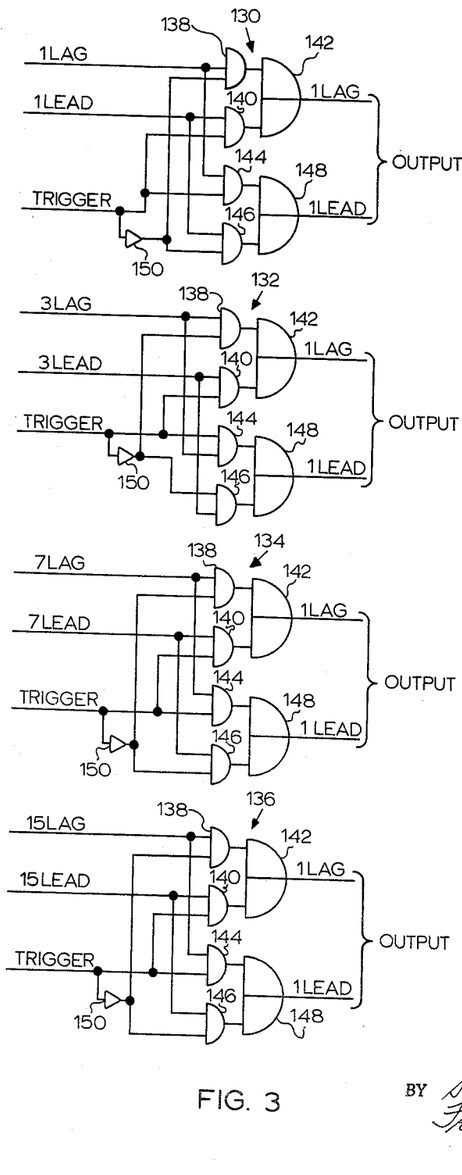
FIG. 3 is a schematic diagram of logic circuits for switching the lead and lag outputs of the drums in the negative region.

When the brushes of the most significant tracks 15 of the groups of tracks 28 and 30 are complemented in the negative region in this manner, the lead and lag brushes for the group of tracks 30 must be switched. The lead and lag brushes contacting the group of tracks 32 must also be switched in the negative region. Referring to FIG. 3, logic circuits 130, 132, 134, 136 are illustrated for accomplishing this. Each of the logic circuits 130, 132, 134, 136 comprises a pair of AND gates 138 and 140 connected to an OR gate 142, and a pair of AND gates 144 and 146 connected to an OR gate 148. The lag output terminals (FIG. 2) are connected directly to the AND gates 138 and the lead output terminals are connected directly to the AND gates 140. The output of the trigger circuit 100 (FIG. 2) is applied directly to the AND gates 140 and 144, and to the AND gates 138 and 146 through an inverter 150. When the output of the trigger circuit 100 is a 0 in the positive region, the gates 138 and 146 are enabled and the lag and lead outputs are read out through these gates and through the OR gates 142 and 148 to produce the lag and lead outputs as indicated. However, when the trigger signal is a 1 voltage in the negative region, the gates 140 and 144 are enabled, and the lead outputs are read out through the gates 140 and 142, and the lag outputs are read out through the gates 144 and 148.

Figure 4A:
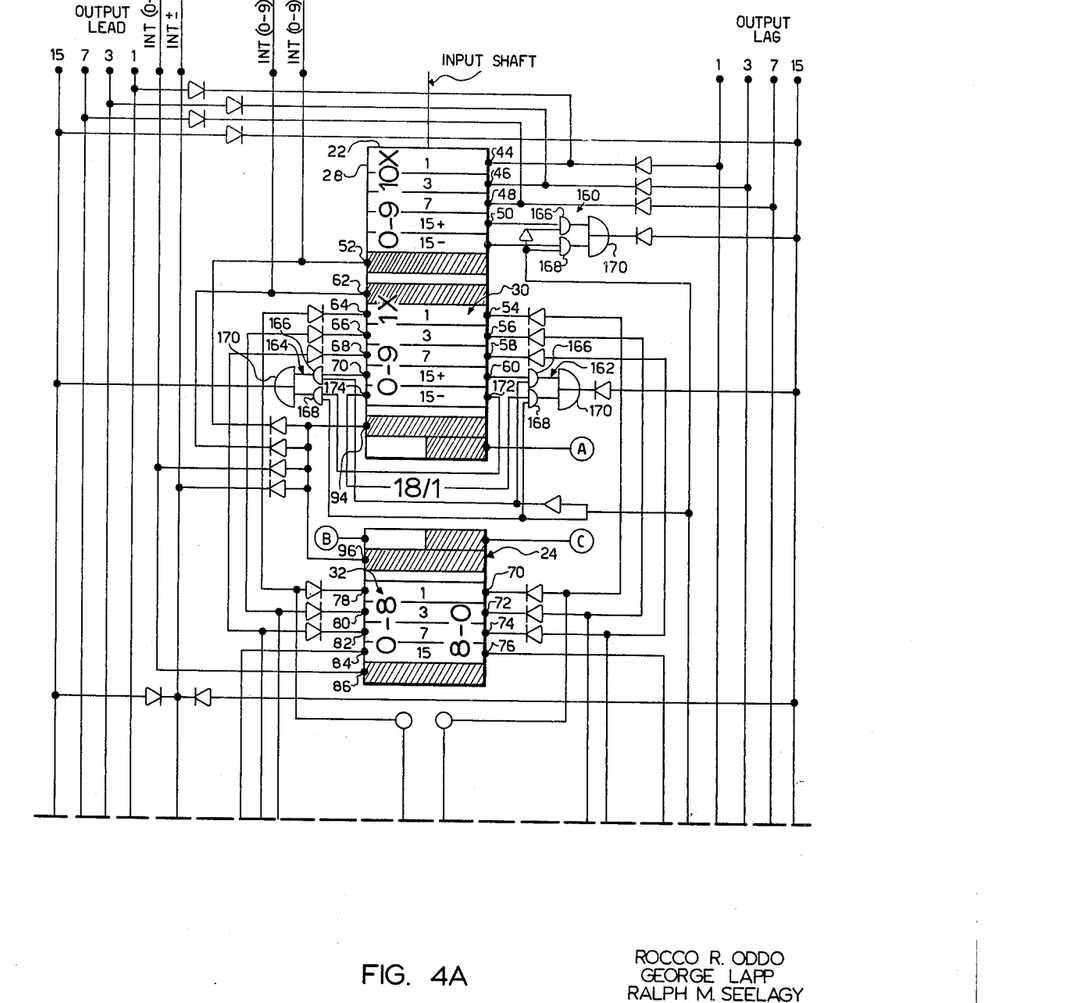
FIGS. 4a and 4b jointly constitute a schematic diagram of another embodiment of the invention.
Figure 4B:
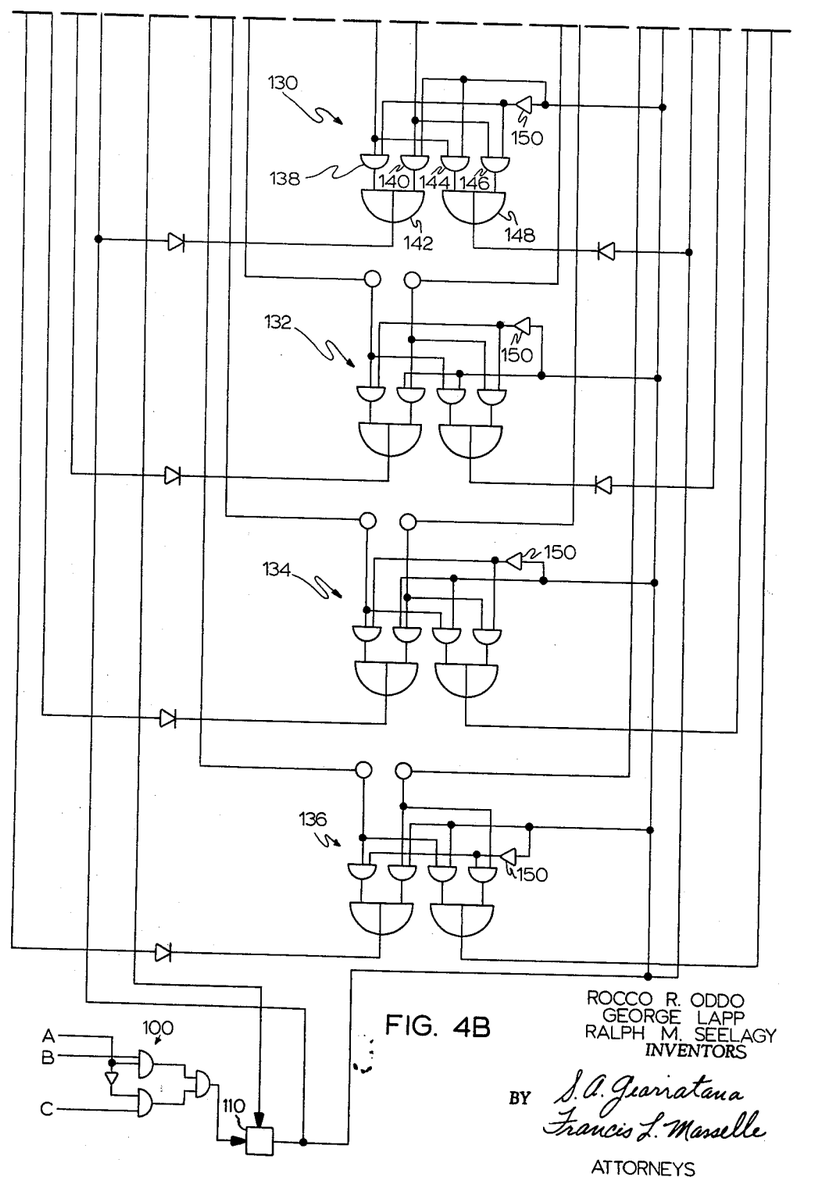

Referring to FIG. 4, another embodiment of the present invention is illustrated. This embodiment primarily differs from the embodiment of FIGS. 1–3 in that the most significant code tracks of the groups of tracks 28 and 30 have been designated at 15+ and an additional track designated as 15— has been added to each of the groups 28 and 30 adjacent to the 15+ tracks. The 15+ and 15— tracks of the group of tracks 28 are read out through a logic circuit 160 and the 15+ and 15— tracks of the group of tracks 30 are read out through the logic circuits 162 and 164, the lag brushes being read out through the logic circuit 162 and the lead brushes being read out through the logic circuit 164. Each of the logic circuits 160, 162, 164 comprises a pair of AND gates 166 and 168 connected to an OR gate 170. The output of the trigger circuit 100 is applied, by way of logic gate 110, to each of the AND gates 166 after being inverted, and is directly applied to each of the AND gates 168. The brushes from the 15+ tracks are connected directly to the AND gates 166 of a respective one of the logic circuits 160, 162, 164 and the brush of the 15— track of the group 28 is connected directly to the AND gate 168 of the logic circuit 160. However, it will be observed that the lead and lag brushes of the 15— track of the group of tracks 30 are reversed so that the lag brush 172 is connected to the AND gate 168 of the logic circuit 164 and the lead brush 174 is connected to the AND gate 168 of the logic circuit 162.

Since the output of the trigger circuit 100 is a 0 in the positive region (+0 to +89.9) the AND gates 166 of the three logic circuits 160, 162, 164 are enabled when either of the groups of tracks 28 or 30 are interrogated so as to read out the three brushes making sliding electrical contact with the 15+ tracks directly. However, when the output of the trigger circuit 100 is a 1 voltage which indicates that the encoder is in the negative region (−89.9 to −0), the AND gates 18 of the three logic circuits 160, 162, 164 are enabled to read out the three brushes associated with the 15— code tracks. Thus for the first nine revolutions of the drum 22, the 15+ tracks are read out along with the other tracks of their respective groups when an interrogation is performed. However, when either of the groups of tracks 28 or 30 are interrogated during the 10th to the 18th revolutions of the drum 22 which is the negative region, the 15— code tracks are read out. The bits on the 15— tracks are arranged to complement the brushes of these tracks so that the physical readout of 0 to 9 for each of the groups 28 and 30 will be electrically changed to 9–0, as previously discussed. By switching between the 15+ and 15— tracks in this manner, the need for the three logic circuits 118, 120, 122 (FIG. 2) is eliminated. In addition by switching the lead and lag brushes 174 and 172 associated with the 15— track of the group of tracks 30, the need for a logic circuit 130 as illustrated in FIG. 3 to switch these lead and lag brushes in the negative region is eliminated. However, the remaining lead and lag brushes associated with the group of code tracks 30 and 32 still must be switched in the negative region and, therefore, the four logic circuits 130, 132, 134, 136 must be provided.

Referring specifically to the logic circuit 130, it will be observed that the lead brushes 64 and 78 of the tracks 1 of the groups of tracks 30 and 32 are connected directly to the AND gates 138 and 144, and that the lag brushes 54 and 70 associated with these same tracks 1 are connected directly to the AND gates 140 and 146. The output of the trigger circuit 100 is applied directly to the AND gates 140 and 144 and to the AND gates 138 and 146 through an inverter 150. When the trigger output is a 0 to indicate that the encoder is in the positive region, the gates 138 and 146 will be enabled so that the outputs of the lead brushes 64 and 78 will pass through the gates 138 and 142 to the lead output terminal 1 and the outputs of the lag brushes 54 and 70 will pass through the gates 146 and 148 to the lag output terminal 1. However, when the encoder is in the negative region so that the output of the trigger is a 1 voltage, the gates 140 and 144 will be enabled so that the outputs of the lead brushes 64 and 78 will pass through the gates 144 and 148 to the lag output terminal 1 and the outputs of the lag brushes 54 and 70 will pass through the gates 140 and 142 to the lead output terminal 1. The logic circuits 132, 134 and 136 will switch the lead and lag outputs of the tracks 3, 7 and 15 of the groups of track 30 and 32 in the same manner in the negative region.

As stated at the outset of this application the present invention provides an encoder with an unambiguous output and this is true of the embodiments described above insofar as present day computers are concerned because the resolution of general present day computers cannot discern an ambiguity of less than one minute of an arc. However, because of the advancing state of the computer art, it has become necessary to design a fool-proof scheme which eliminates any possibility of ambiguity. In the foregoing embodiments, ambiguity exists when the most significant bit of the group of tracks 28 and the A brush on the high speed switching track change simultaneously. In accordance with the embodiment of the present invention illustrated in FIG. 5, this condition is overcome by using the most significant bit of the group 28 to initiate the trigger signal. In addition, an A' brush is added to the high speed switching track 40 which functions as a lag brush for the A brush. With these changes it is necessary to electrically isolate the most significant track 15 of the group of tracks 28 as illustrated in FIG. 5 and to provide a logic gate 220 to give a proper readout when the group 28 is interrogated and to prevent a readout when any other interrogation is performed.

Figure 5A:
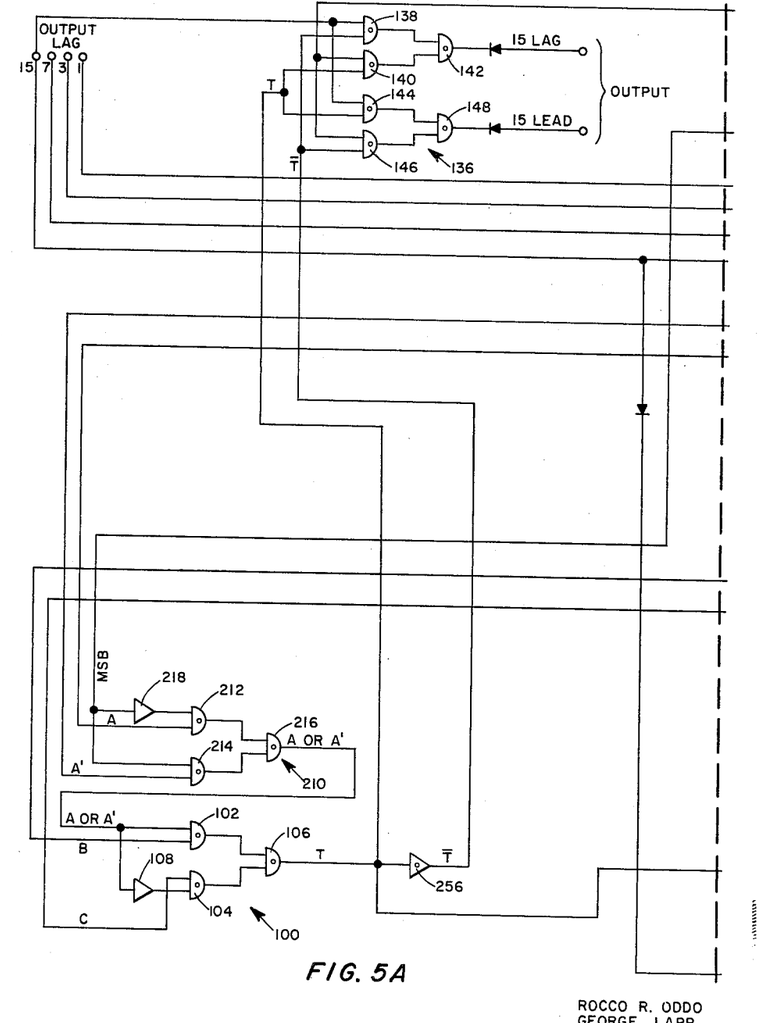
FIGS. 5a, 5b and 5c jointly constitute a schematic diagram of still another embodiment of the invention.
Figure 5B:
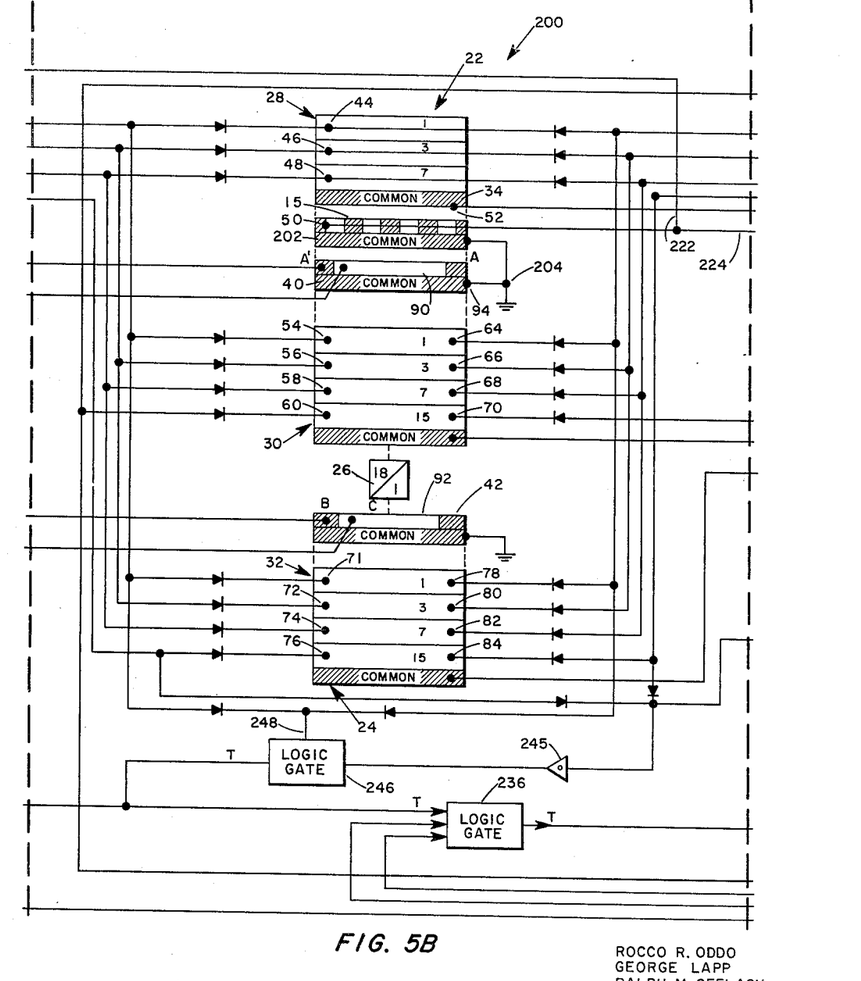
Figure 5C:
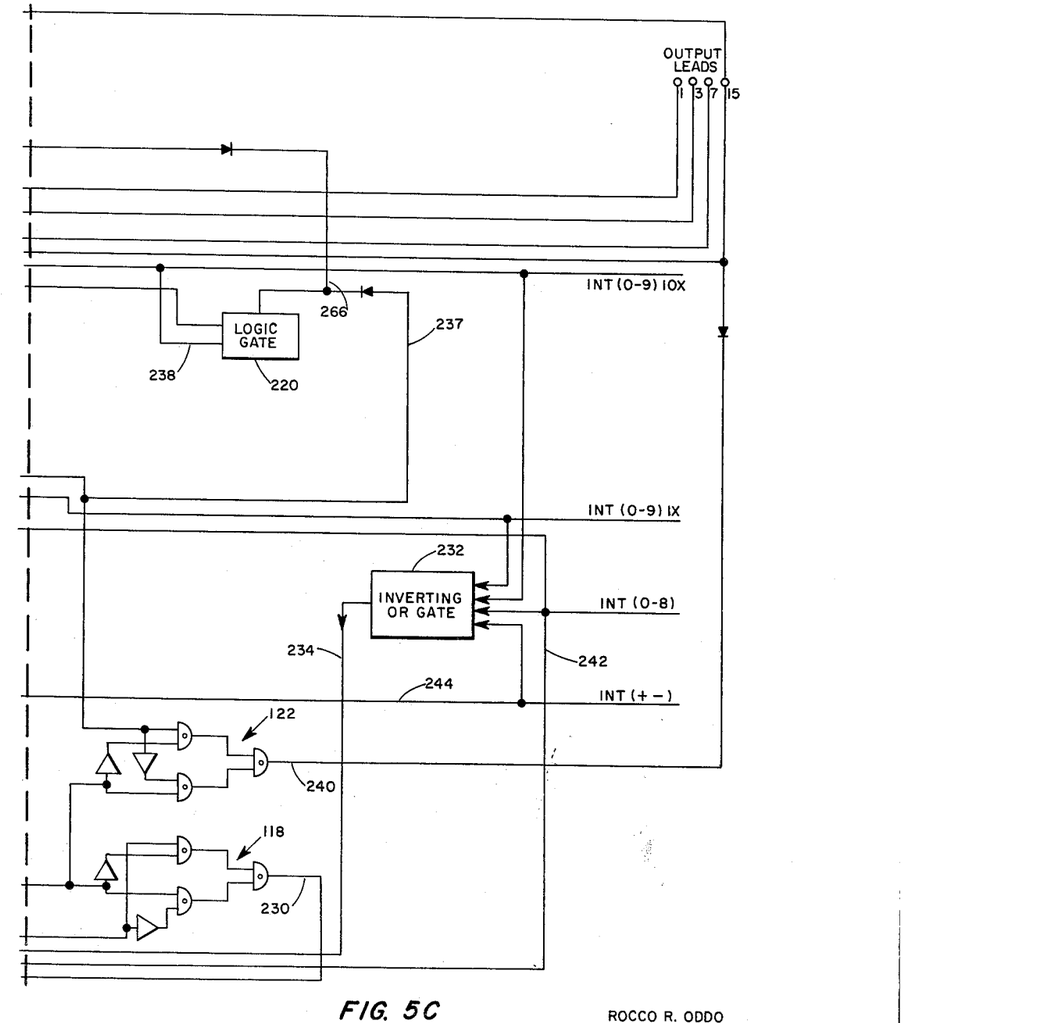

As in the other embodiments the encoder 200 illustrated in FIG. 5 employs the high speed drum 22 and the low speed drum 24 connected together by the speed reducer 26 with the 18–1 speed reduction. The high speed drum 22 has the groups of tracks 28 and 30 and the low speed drum has the single group of tracks 32. The high speed switching track 40 is carried on the high speed drum and the low speed switching track 42 is carried on the low speed drum. The most significant track 15 of the group of tracks 28 is electrically isolated from the remaining tracks of the group 28, as mentioned above, and has a separate common track 202 associated therewith which is connected directly to ground at 204 along with the common track of the high speed switching track 40. The brushes A, B and C make electrical contact with the high and low speed switching tracks as before along with the brushes 94 and 96 which engage the common tracks of the high and low speed switching tracks, respectively. The brush 96 is also connected directly to ground.

In the previous embodiments either the B or C brush associated with the low speed switching track is read by the trigger logic circuit 100 (FIG. 2) depending upon the state of the A brush associated with the high speed switching track. As stated previously, this arrangement produces an unambiguous trigger signal as far as present day computers are concerned, however, ambiguity exists when the most significant track 15 of the group of tracks 28 and the A brush simultaneously change state. To overcome this condition, the embodiment illustrated in FIG. 5 provides the A′ brush on the high speed track along with the A brush and the output of the most significant track 15 of the group of tracks 28 is used to initiate the trigger signal. This is accomplished by the logic circuit 210 which comprises a pair of AND gates 212 and 214 connected to an OR gate 216. The output from the brush 50 on the most significant track 15 of the group of tracks 28 is identified as MSB and is applied directly to the gate 214 and to the gate 212 through an inverter 218. The output from the A brush is applied directly to the gate 212 and the output from the A′ brush is applied directly to the gate 214. If the brush 50 is contacting a conducting bit of the most significant track 15, the gate 212 will be enabled and the output of the A brush will be read through the OR gate 216. When the brush 50 is on a non-conducting bit, the gate 214 will be enabled and the output of the A′ brush will be read through the OR gate 216. The A or A′ output from the OR gate 216 is then applied to the logic circuit 100 along with the outputs of the B and C brushes to provide the trigger signal T at the output of the OR gate 106. By reading either the A or A′ brush, depending upon the state of the brush 50 associated with the most significant track 15 of the group of tracks 28, the simultaneous change referred to above as a source of ambiguity is eliminated.

In order to use the most significant track 15 of the group of tracks 28 to initiate the trigger signal as described, it was necessary to electrically isolate this track from the remaining tracks 1, 3 and 7 of the group 28 as already described. It is also necessary to read the brush 50 out through the logic gate 220 in order to give a proper readout when the group of tracks 28 is interrogated. In addition, the logic gate 220 is necessary to prevent improper readout when any other interrogation is performed. This will be more fully understood from the following description of the circuitry of FIG. 5.

The lag output terminals 1, 3, 7 and 15 are illustrated at the top left-hand corner of FIG. 5 and the lead output terminals 1, 3 and 7 are at the top right-hand corner of the figure. This is the reverse of FIG. 2, and is noted at this time since it changes the positions of the lead and lag brushes relative to the drums as shown in the drawing. However, the lead and lag brushes are designated by the same numbers in FIG. 5 as in FIG. 2. The lag brushes are the brushes 44, 46, 48, 50 contacting the group of tracks 28, 54, 56, 58, 60 contacting the group of tracks 30 and 71, 72, 74, 76 contacting the group of tracks 32. The lead brushes are the brushes 64, 66, 68, 70 contacting the group of tracks 30, and 78, 80, 82, 84 contacting the group of tracks 32. The lag brushes 44, 46 and 48 are connected directly to the lag output terminals 1, 3 and 7, respectively, through suitable sneak circuit diodes and are also connected to the lead output terminals 1, 3 and 7, respectively.

The output of the logic gate 220 is connected by a lead 226 to the logic circuit 118 which complements the most significant bit in the negative region, as previously described in connection with FIG. 2. The output of the logic circuit 118 is connected to the lag output terminal 15 by a lead 230. The common brush 52 contacting the common track 34 is connected directly to the (0–9)10X interrogate terminal, and the (0–9)10X terminal is also connected to an inverting OR gate 232. The output lead 234 of the gate 232 is connected to a logic gate 236 to which the trigger signal T from the logic circuit 100 is also applied. When the (0–9)10X interrogate terminal is grounded to interrogate the group of tracks 28, the inverting OR gate 232 produces an output signal which enables the logic gate 236 so that the trigger signal T is applied to the logic circuit 118 to complement the most significant bit of the track 15 in the negative region. The (0–9)10X interrogate terminal is also connected to the logic gate 220 to enable the gate when the interrogate terminal is grounded. When the gate 220 is enabled in this manner, the output of the brush 50 applied to the gate 220 by the lead 224 will pass through the logic gate 220 to the logic circuit 118 va the lead 226. The output lead 230 of the logic circuit 118 is connected to the lag output terminal 15 to complement the output at the lag output terminal 15 in the negative region. A lead 238 also applies the output of the logic gate 220 to the logic circuit 122 which is the same as the logic circuit 122 of FIG. 2. The output lead 240 of the logic circuit 122 is connected directly to the lead output terminal 15 to complement the output at this terminal in the negative region. It will be observed that the trigger signal T obtained from the trigger logic circuit 100 is applied to both of the logic circuits 118 and 122 through the logic gate 236. When the (0–9)10X interrogate terminal is grounded to interrogate the group of tracks 28, it also enables the logic gate 236 through the inverting OR gate 232 to enable the trigger signal T to pass through the logic gate 236 to the logic circuits 118 and 122 to control the complementing of the lag and lead outputs in the negative region. The logic gate 220 is only enabled when the (0–9)10X interrogate terminal is grounded and, therefore, the output of the brush 50 associated with the most significant track 15 of the group of tracks 28 will not be transmitted to the logic circuits 118 and 122 when any other interrogation is performed or when no interrogation is performed.

The lag brushes 54, 56, 58 and the lag brushes 70, 72, 74 are connected directly to the lag output terminals 1, 3 and 7, respectively, through suitable sneak circuit diodes. Similarly, the lead brushes 64, 66, 68 and the lead brushes 78, 80, 82 are connected to the lead output terminals 1, 3 and 7, respectively, through suitable sneak circuit diodes. The lag brush 76 contacting the track 15 of the group of tracks 32 is also connected directly to the lag output terminal 15 and the lead brush 84 is similarly connected to the lead output terminal 15 through suitable sneak circuit diodes because the output from these brushes does not have to be complemented in the negative region. The brush 60 associated with the most significant track 15 of the group of tracks 30 is connected directly to the logic circuit 118 and the lead brush 70 associated with the same track 15 is connected to the logic circuit 122 so that the outputs of these brushes will be complemented in the negative region by the logic circuits 118 and 122, respectively. When the (0–9)1X interrogate terminal is grounded to interrogate the group of tracks 30 it also enables the logic gate 236 through the inverting OR gate 232 to apply the trigger signal T to the logic circuits 118 and 122.

The interrogate terminal (0–8) is grounded to interrogate the group of tracks 32. As already stated, the output of the most significant track 15 of this group does not have to be complemented and, therefore the brushes 76 and 84 are connected directly to the lag output terminal 15 and lead output terminal 15, respectively. However, if the logic gate 236 were enabled by the grounding of the (0–8) interrogate terminal, the trigger signal would pass through the gate 236 to the logic circuits 230 and 240 and might possibly result in a false signal being delivered to the lag and lead output terminals 15. To prevent this possibility, the (0–8) interrogate terminal is connected by a lead 242 directly to the logic gate 236 to disable the logic gate 236 whenever the (0-8) interrogate terminal is grounded to interrogate the group of tracks 32.

When the ± interrogate terminal is grounded to interrogate the high and low speed switching tracks 40 and 42, the logic gate 236 is enabled through the inverting OR gate 232 as previously described. A lead 244 also connects the ± interrogate terminal to an inverter 245 which is connected to a logic gate 246 to enable the logic gate when the ± interrogate terminal is grounded. The trigger signal T from the logic circuit 100 is also applied to the logic gate 246 and passes therethrough when the gate is enabled by the inverter 245. The output lead 248 of the logic gate 246 is connected to both the lag output terminal 1 and the lead output terminal 1 to apply the trigger signal T to these terminals whenever the ± interrogate terminal is grounded. When the encoder is in the positive region +0 to 89.9, the output of the electromechanical trigger is 0, and when in the negative region, the output of the electromechanical trigger is a 1 voltage. The lead 244 is also connected to the lag and lead output terminals 15 through suitable sneak circuit diodes to automatically complete the circuits to the lead and lag terminals 15 when the ± interrogate terminal is grounded. Therefore the output at both the lag and lead output terminals will be 0001 when the electromechanical trigger is in the positive region and 1001 when the trigger is in the negative region. In the Gray code excess 3 notation, the 0001 output represents the number 12 and the 1001 output represents the number 11, as previously mentioned.

As in the embodiment of FIG. 2, each of the lag and lead output terminals 1, 3, 7 and 15 are passed through logic circuits 130, 132, 134, 136 (FIG. 3) so as to switch the lead and lag brushes in the negative region. In FIG. 5, only the logic circuit 136 is illustrated for switching the outputs of the lead and lag output terminals 15 in the negative region. It will be observed that the lead and lag output terminals 15 are connected to the logic circuit 136 in the same manner as the lead and lag output terminals 15 are connected thereto in FIG. 3. The uninverted trigger signal T is likewise applied in the same manner and the trigger signal is inverted by an inverter 256 with the inverted trigger signal being applied to the logic circuit as before. In the positive region, the inverted trigger signal T enables the gates 138 and 146 to produce a normal output as illustrated without switching the lead and lag designations. In the negative region, the uninverted trigger signal T enables the gates 140 and 144 to switch the lead and lag outputs. The other lag and lead output terminals 1, 3 and 7 are connected in the same manner to the logic circuits 130, 132 and 134, respectively, but this has not been shown in FIG. 5 since the manner in which this would be accomplished is apparent from the foregoing specific description of the logic circuit 136.

While it will be apparent that the embodiments of the invention herein disclosed are well calculated to fulfill the objects of the invention, it will be appreciated that the invention is susceptible to modification, variation and change without departing from the proper scope or fair meaning of the subjoined claims.

What is claimed is:

1. An encoder having a maximum output reading of 89.9 units comprising a high speed drum and a low speed drum drivingly connected together with an 18 to 1 gear ratio, first and second groups of code tracks encircling said high speed drum, a third group of code tracks encircling said low speed drum, the code of each of said three groups of code tracks being a Gray code excess 3 with the first group of code tracks representing the numbers 0-9 of the least significant digit of the encoder output and the second group of code tracks representing the numbers 0-9 of the next most significant digit and the third group of code tracks representing the numbers 0-8 and 8-0 of the most significant digit, output means for reading each of said code tracks, means for generating a trigger signal having a first state during the first nine revolutions of said high speed drum and a second state during the tenth of the eighteenth revolutions of said high speed drum, first logic circuit means connected to the output means associated with the most significant code track of said first group and controlled by said trigger signal to complement the output means connected thereto during the tenth to the eighteenth revolutions of the high speed drum, and second logic circuit means connected to the output means associated with the most significant code track of said second group of tracks and controlled by said trigger signal to complement the output means connected thereto during the tenth to the eighteenth revolutions of said high speed drum.

2. The invention as defined in claim 1 including additional output means associated with each of the code tracks of said second and third groups of code tracks, each of said additional output means co-operating with the other output means associated with the same track to provide lead and lag outputs, and third logic circuit means connected to the additional output means associated with the most significant track of said second group and controlled by said trigger signal for complementing the output connected thereto during the tenth to the eighteenth revolutions of said high speed drum.

3. The invention as defined in claim 2 including logic circuit means controlled by said trigger signal for switching the lead and lag outputs of said second and third logic circuit means and the output means associated with the other code tracks of said second and third groups of code tracks.

4. A binary encoder having a maximum output reading of 89.9 units comprising high and low speed drums coupled together with an 18 to 1 gear ratio, first and second groups of code tracks encircling said high speed drum and a third group of code tracks encircling said low speed drum, the code of each of said these groups of code tracks being a Gray code excess 3 with four code tracks in each group, a separate common track associated with each group of tracks, a separate brush contacting each of said tracks, an additional brush contacting each of the code tracks of said second and third groups of code tracks and co-operating with the other brush associated with the same track to provide lead and lag outputs, the first group of code tracks representing the numbers 0-9 of the least significant digit of the encoder output with the second group of code tracks representing the numbers 0-9 of the next most significant digit and the third group of code tracks representing the numbers 0-8 and 8-0 of the most significant digit, means for generating a trigger signal having a first state during the first nine revolutions of said high speed drum and a second state during the second nine revolutions of said high speed drum, first logic circuit means connected to the brush contacting the most significant track of said first group of tracks and controlled by said trigger signal to complement the output of the brush connected thereto, second and third logic circuit means connected to different ones of the two brushes contacting the most significant track of said second group of code tracks and controlled by said trigger signal for complementing the output of the brush connected thereto during said second nine revolutions, first, second, third and fourth lag output terminals, first, second, third and fourth lead output terminals, circuit means for connecting the first three brushes contacting the first group of code tracks to the first, second and third lead and lag output terminals respectively, circuit means for connecting the output of said first logic gate to the fourth lead and lag output terminals, circuit means for connecting the output of said second logic circuit to said fourth lag output terminal, circuit means for connecting said third logic circuit means to said fourth lead output terminal, circuit means for connecting the first three lag brushes of said second group of code tracks to the first three lag output terminals, circuit means for connecting the first three lead brushes of said second group of code tracks to the first three lead output terminals, circuit means for connecting the four lag brushes of said third group of code tracks to said four lag output terminals, circuit means for connecting the four lead brushes of said third group of code tracks to said four lead output terminals, first, second and third interrogate terminals, and circuit means connecting said first, second and third interrogate terminals to the brushes contacting the common tracks of said first, second and third groups of code tracks respectively.

5. A encoder having a maximum output reading of 89.9 units comprising a high speed drum and a low speed drum drivingly connected together with an 18 to 1 gear ratio, first and second groups of code tracks encircling said high speed drum, a third group of code tracks encircling said low speed drum, the code of each of said three groups of code tracks being a Gray code excess 3 with the first group of code tracks representing the numbers 0–9 of the least significant digit of the encoder and the second group of code tracks representing the numbers 0–9 of the next most significant digit and the third group of code tracks representing the numbers 0–8 and 8–0 of the most significant digit, a separate common track associated with each of said three groups of code tracks and a separate common track associated with the most significant track of said first group of code tracks, brush means slidably contacting each of said tracks, said last-mentioned common track being connected directly to ground, a high speed switching track on said high speed drum, a low speed switching track on said low speed drum, lead and lag brushes contacting said high speed switching track, lead and lag brushes contacting said low speed switching track, first trigger logic circuit means connected to the lead and lag brushes contacting said high speed track and controlled by the state of the brush means associated with the most significant track of said first group of code tracks for reading out one or the other of the lead and lag brushes connected thereto, second trigger logic circuit means connected to the lead and lag brushes contacting said low speed track and controlled by the output of said first trigger logic circuit means for reading out one or the other of the lead and lag brushes connected thereto, said second trigger logic circuit means producing a trigger signal having a first state during the first nine revolutions of said high speed drum and a second state during the second nine revolutions of the high speed drum, first logic circuit means connected to the brush means associated with the most significant code track of said first group and controlled by said trigger signal to complement the output of the brush means connected thereto during said second nine revolutions of the high speed drum, and second logic circuit means connected to the brush means associated with the most significant code track of said second group of code tracks and controlled by said trigger signal to complement the output of the brush means connected thereto during said second nine revolutions of the high speed drum.

6. In a binary encoder, a high speed drum and a low speed drum drivingly connected together for rotation at a predetermined speed relative to one another, a group of code tracks encircling said high speed drum, the code of said group of code tracks being a Gray code excess 3, output means for reading each of said code tracks, a high speed switching track on said high speed drum, a low speed switching track on said low speed drum, lead and lag output means for reading said high speed switching track, lead and lag output means for reading said low speed switching track, a first trigger logic circuit connected to the lead and lag output means of said high speed switching track and controlled by the output means of the most significant track of said group of code tracks for reading either the lead or lag output means connected thereto, a second trigger logic circuit means connected to the lead and lag output means of said low speed switching track and controlled by the output of said first trigger logic circuit means for reading either the lead or lag output means connected thereto to produce a trigger signal output, and logic circuit means connected to the output means associated with the most significant track of said group of tracks and controlled by said trigger signal to complement the output means connected thereto at predetermined unambiguous intervals.

7. A encoder having a maximum output reading of 89.9 units comprising a high speed drum and low speed drum, continuous gear means drivingly interconnecting said drums with an 18 to 1 gear ratio, first and second groups of code tracks encircling said high speed drum, a third group of code tracks encircling said low speed drum, the code of each of said groups of code tracks being a Gray code excess 3 with the first group of code tracks representing the numbers 0–9 of the least significant digit of the encoder output and the second group of code tracks representing the numbers 0–9 of the next most significant digit and the third group of code tracks representing the numbers 0–8 and 8–0 of the most significant digit, means for generating a trigger signal having a first state during the first nine revolutions of said high speed drum and a second state during the second nine revolutions of said high speed drum, first and second additional code tracks encircling said high speed drum and associated with said first and second groups of code tracks respectively, each of said additional code tracks being identical to and shifted one bit relative to the most significant code tracks of the first and second groups, output means for reading each of said code tracks, first logic circuit means connected to the output means associated with the most significant code track of said first group and said first additional code track and controlled by said trigger signal for reading out the output means associated with the most significant code track connected thereto when said trigger signal is in its first state and reading out the output means associated with said first additional code track when said trigger signal is in its second state, and second logic circuit means connected to the output means associated with the most significant code track of said second group of code tracks and said second additional code track and controlled by said trigger signal for reading out the output means associated with the most significant track connected thereto when said trigger signal is in its first state and reading out the output means associated with said additional code track when said trigger signal is in its second state.

References Cited by the Examiner

UNITED STATES PATENTS 2,958,861 11/60 Luongo et al. _________ 340—347
2,975,409 3/61 Petherick ____________ 340—347
2,976,528 3/61 Greunke et al. _________ 340—347

MALCOLM A. MORRISON, *Primary Examiner.*